United States Patent [19]

Petro

[11] Patent Number: 4,991,799
[45] Date of Patent: Feb. 12, 1991

[54] ORBITAL DEBRIS SWEEPER AND METHOD

[75] Inventor: Andrew J. Petro, Houston, Tex.

[73] Assignee: The United States of America as represented by the Administrator of the National Aeronautics and Space Administration, Washington, D.C.

[21] Appl. No.: 480,985

[22] Filed: Feb. 16, 1990

[51] Int. Cl.$^5$ .............................................. B24G 1/00
[52] U.S. Cl. .................................. 244/158 R; 244/14
[58] Field of Search ............... 244/158, 165, 169, 170, 244/14; 73/432.1

[56] References Cited

U.S. PATENT DOCUMENTS

| | | | |
|---|---|---|---|
| 3,004,735 | 10/1961 | Kinard | 244/14 |
| 3,277,724 | 10/1966 | Lundeberg | 73/432 |
| 3,304,028 | 2/1967 | Dryden | 244/1 |
| 3,446,068 | 5/1969 | Slattery et al. | 73/432.1 |
| 4,076,191 | 2/1978 | Binge | 244/173 |
| 4,384,692 | 5/1983 | Preukschat | 244/158 R |
| 4,684,084 | 8/1987 | Fuldner et al. | 244/168 |
| 4,750,692 | 6/1988 | Howard | 244/158 R |
| 4,936,528 | 6/1990 | Butner et al. | 244/158 |

Primary Examiner—Joseph F. Peters, Jr.
Assistant Examiner—Virna Lissi Mojica
Attorney, Agent, or Firm—Hardie R. Barr; John R. Manning; Edward K. Fein

[57] ABSTRACT

An orbital debris sweeper is provided for removing particles from orbit which otherwise may impact and damage an orbiting spacecraft. The debris sweeper includes a central sweeper core which carries a debris monitoring unit, and a plurality of large area impact panels rotatable about a central sweeper rotational axis. In response to information from the debris monitoring unit, a computer determines whether individual monitored particles preferably impact one of the rotating panels or pass between the rotating panels. A control unit extends or retracts one or more booms which interconnect the sweeper core and the panels to change the moment of inertia of the sweeper and thereby the rotational velocity of the rotating panels. According to the method of the present invention, the change in panel rotational velocity increases the frequency of particles which desirably impact one of the panels and are thereby removed from orbit, while large particles which may damage the impact panels pass between the trailing edge of one panel and the leading edge of the rotationally succeeding panel.

20 Claims, 1 Drawing Sheet

ORBITAL DEBRIS SWEEPER AND METHOD

ORIGIN OF THE INVENTION

The invention described herein was made by an employee of the United States Government and may be manufactured and used by or for the Government of the United States of America for governmental purposes without the payment of any royalties thereon or therefor.

1. Technical Field

The invention relates to methods and apparatus for reducing orbital debris and, more particularly, relates to techniques for automatically regulating operation of an orbital debris sweeper to control debris impact.

The examination of returned satellite hardware has shown that many portions of a spacecraft are susceptible to damage from high velocity impact with orbital space debris. Orbital space debris is of particular concern for low-earth orbit spacecraft, and research is ongoing to devise new materials and exterior coatings for spacecraft to provide better protection against surface erosion and pitting that result from repeated impact with orbital space debris.

Large debris or particles which would cause catastrophic damage to a spacecraft can be continuously tracked by earth-based systems, and orbiting spacecraft maneuvered in response to those systems so that they do not collide with such large objects. It is impractical, however, to continuous track small or intermediate sized particles, or to maneuver spacecraft to avoid collision with all such particles. Accordingly, it has been proposed to provide a plurality of orbital debris removers which would purposely collide with orbital debris, thereby reducing the debris population and minimizing damage to orbiting spacecraft. The debris which impacted the remover could become embedded therein, but more likely would decelerate sufficiently as a result of the impact to cause a rapid decay of the debris from orbit.

U.S. Pat. No. 3,277,724 is directed to a device for measuring the mass and velocity of meteoroid particles which collide therewith. The device consists of two inflatable spherical structures, one of which is concentrically mounted within the other. The collision of particles with the device results in a short circuit between adjacent metallic layers, which in turn provides an indication of the mass of the debris particle which impacted the device. U.S. Pat. No. 3,004,735 discloses an inflatable panel adapted to be towed behind a launch vehicle to determine the debris particle environment in the vicinity of the vehicle. The energy content and frequency of particles colliding with the panel can be measured.

While the above patents recognize the significant adverse affects of debris colliding with orbiting spacecraft, they do not teach an effective solution for reducing the population of such debris. Even if the size of the above measuring devices was substantially increased in an attempt to reduce debris population rather than merely measure the damage caused by such debris, neither device is provided with a system for influencing the frequency of debris collisions. A large debris object could impact and soon destroy the device disclosed in the '724 patent. Providing a conventional propulsion system for such a device to avoid impact with large objects, or to provide a separate towing spacecraft as shown in the '735 patent, is considered cost prohibitive.

The disadvantages of the prior art are overcome by the present invention, and a relatively simple and cost effective orbital debris sweeper and method of operating the sweeper are hereinafter disclosed for reducing the population of orbital debris. The techniques of the present invention are well-suited for monitoring the course of orbiting debris which could impact the sweeper and for detecting the approximate size of such debris.

The sweeper may be automatically regulated in response to such monitoring data to increase the frequency of desired collisions with intermediate sized debris, and reduce or eliminate the frequency of collision between the orbital sweeper and large debris which might damage the operation of the sweeper.

STATEMENT OF THE INVENTION

The orbital debris sweeper comprises a spacecraft core and a plurality of relatively thin large-area panels each secured to the core by a boom or arm. The core carries a debris tracking device for continuously monitoring the location of intermediate and large orbital debris which may pass through an area "covered" or swept by the sweeper. The tracking device has the capability to estimate the approximate size of specific objects prior to impact with the sweeper. Each of the arms is radially extendable and retractable with respect to the core to control the moment of inertia of the sweeper.

In operation, the panels continuously rotate around the spacecraft core. Based on the size of each monitored particle which has a trajectory passing through the swept area, a computer determines whether it is desirable for each particle to impact one of the panels. Since the purpose of the sweeper is to remove objects from the population of orbiting debris, a collision between most of the monitored particles and one of the panels is desired. On the other hand, large particles preferably pass between rotating panels rather than risk catastrophic damage to the panels and/or the entire sweeper.

The desired impact determination is utilized to control the extension or retraction of one or more booms, thereby affecting the moment of inertia of the debris sweeper and thus the rotational velocity of the panels. Accordingly, large particles intentionally pass between the trailing edge of one panel and the leading edge of the next panel, while small and intermediate sized particles are effectively removed from the population of orbiting debris by impacting one of the panels and either becoming embedded therein, or by significantly effecting deceleration of those intermediate sized objects to cause rapid decay from orbit. In the event that a large object is on track to possibly impact the spacecraft core, the panel arms could be extended or retracted asymmetrically, thereby causing a change in the position of the core. In this manner, the relative position of the core effectively moves to avoid collision with a large object. Symmetrical panel arm extension techniques could then be used to cause the large object to pass between the rotating panels. Alternatively, the change in core position could be sufficient to cause the large object to pass outside the periphery of the rotating panels.

Accordingly, it is an object of the present invention to provide an improved orbital debris sweeper for reducing the population of debris in an orbit which could otherwise damage spacecraft. The sweeper includes a plurality of panels which rotate about a core. The extension or retraction of the panels effects a change in their rotational velocity, which in turn allows large objects to purposely pass between rotating panels. Small and intermediate sized debris intentionally impacts one of the panels, and the rotational velocity of the panels is controlled to increase this desired collision and thereby reduce orbiting debris population.

These and further objects, features, and advantages of the present invention will become apparent from the following detailed description, wherein reference is made to the figures in the accompanying drawings.

DETAILED DESCRIPTION OF THE INVENTION

The orbital debris sweeper according to the present invention is intended to reduce the population of orbiting debris. This debris is of particular concern for low-earth orbit spacecraft, which have exhibited surface pitting and corrosion due to orbital debris impact. While orbital debris consists of particles of various sizes, current earth-based tracking systems have the capability of monitoring large debris particles greater than approximately 5 centimeters in diameter. Spacecraft may thus be maneuvered to avoid collision with such large particles, thereby avoiding catastrophic damage to the spacecraft.

Most orbiting debris, however, consists of intermediate sized particles in the range of from 1 centimeter to 5 centimeters, and small particles less than approximately 1 centimeter in diameter. These intermediate sized and small sized particles cannot be reliably tracked by earth-based systems, and it would be impractical to attempt to maneuver orbiting spacecraft to avoid impact with all such particles. The sweeper of the present invention is intended to efficiently reduce the population of such intermediate and small particles which would otherwise damage orbiting spacecraft, while at the same time avoiding collision with large particles which could cause catastrophic damage to the sweeper.

Figure 1:
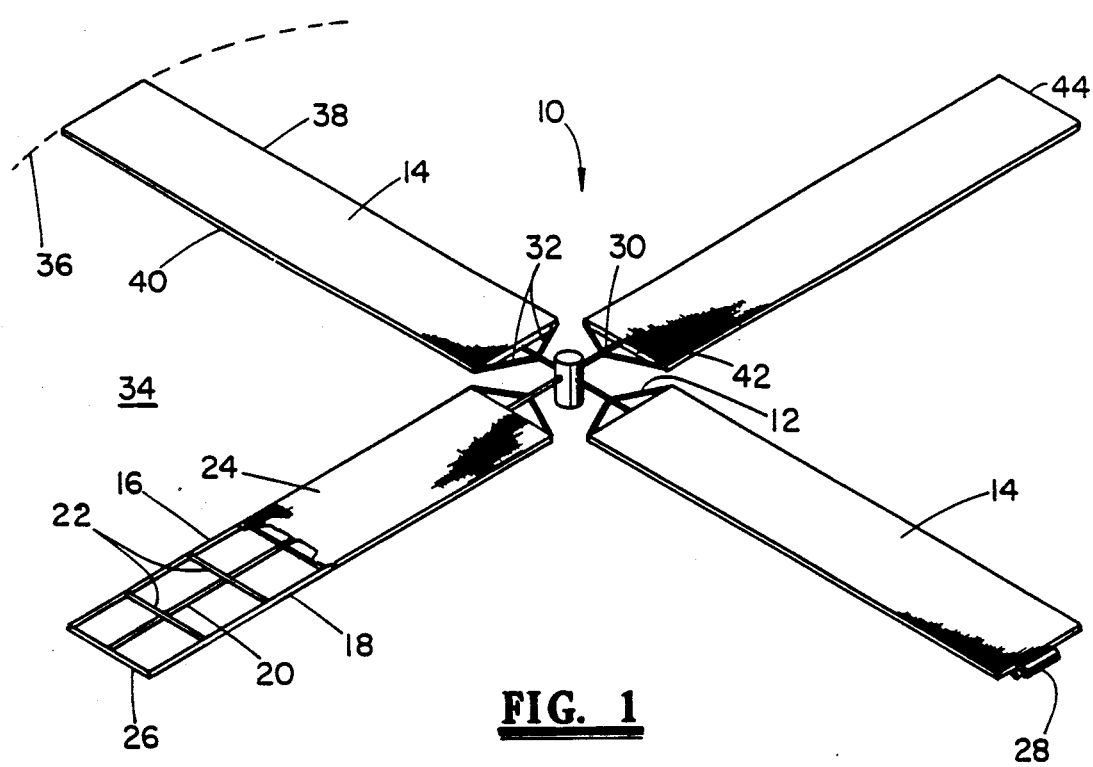
FIG. 1 is a simplified pictorial view of a suitable orbital debris sweeper according to the present invention, with a portion of the fabric material for one of the impact panels removed to illustrate the frame of that panel.

FIG. 1 depicts a simplified sweeper 10 according to the present invention, which comprises a sweeper core 12 and a plurality of impact panels 14 each extending radially outward from the core 12. FIG. 1 depicts a sweeper with four panels spaced at 90° intervals, although a sweeper with two panels, three panels or six or more panels could be employed. The panels are symmetrically arranged about the core, and continually rotate and thus "sweep" an area.

According to the present invention, one or more orbiting debris sweepers could be deployed from a maneuvering spacecraft (not shown). The rotating impact panels 14 may extend 1,000 meters or more from the central sweeper core 12, so that an area in excess of several square kilometers could be swept by each orbiting sweeper. Due to the size of each sweeper, those skilled in the art appreciate that the sweeper is assembled in orbit according to conventional techniques.

Each impact panel 14 comprises a light-weight frame 16 and a sheet-like fabric material 24 supported on the frame. The frame 16 consists of radially extending elongate edge supports 18, one or more intermediate radially extending supports 20, and a plurality of cross supports 22 each interconnecting the edge supports and the intermediate supports to form a grid. Each panel shown in FIG. 1 may have exemplary dimensions of 200 meters in width and 1,250 meters in length, with the thickness of each panel (less than 1 meter) determined by the required cross-section of the frame 16. The impact panels 14 are thus relatively thin, substantially planar members each positioned within the plane swept by the rotating panels.

Initial rotation of the sweeper panels may be provided by the maneuvering spacecraft. The rotational velocity of the panels may slowly decrease due to drag effects from impacting debris, solar winds, gravity gradient effects and solar radiation pressure. A low thrust level reaction jet assembly 28 may be mounted on the most radially outward cross support 26 of one or more of the panels 14 to increase the rotational velocity of the panels. Each reaction jet assembly 28 may utilize an electric propulsion system, so that propellent is ionized and expelled by the force of an electrical field to create a desired low level thrust.

As shown in FIG. 1, each impact panel 14 may be structurally connected to the sweeper core by an arm or boom 30. A pair of side supports 32 each extending between the frame 16 and a corresponding boom 30 provide additional support to maintain each rotating impact panel substantially within the swept plane 34, which is defined by a circular-shaped dashed line 36 partially depicted in FIG. 1. Each rotating panel has a leading side or edge 40, a trailing side or edge 38, a radially inward end 42, and a free or cantilevered end 44 extending radially outward from the sweeper core. As shown in FIG. 1, each panel 14 is preferably identical in shape and extends substantially a uniform distance from the sweeper core 12.

The debris impact area of each panel is defined by the fabric material 24 supported on the light-weight frame 16. The frame 16 covers a relatively small portion (preferably substantially less than 1%) of the debris impact area of each panel, and merely provides a structure for maintaining the desired shape of the fabric material 24. The members 18, 20 and 22 thus define a grid having substantial voids between the structural members, so that debris particles will not likely impact the frame 16. Intermediate particles which impact a panel will typically pierce through the fabric material 24, but will not tear or otherwise cause significant damage to this material When piercing through the fabric, intermediate particles will decelerate sufficiently so that most particles will thereafter soon fall out of orbit. Small particles less than 1 centimeter in nominal diameter may similarly either pierce through the fabric 24 and decay from orbit, or may become embedded in the fabric. In either event, impact of the debris with the panel substantially reduces the population of the orbiting debris.

Figure 2:
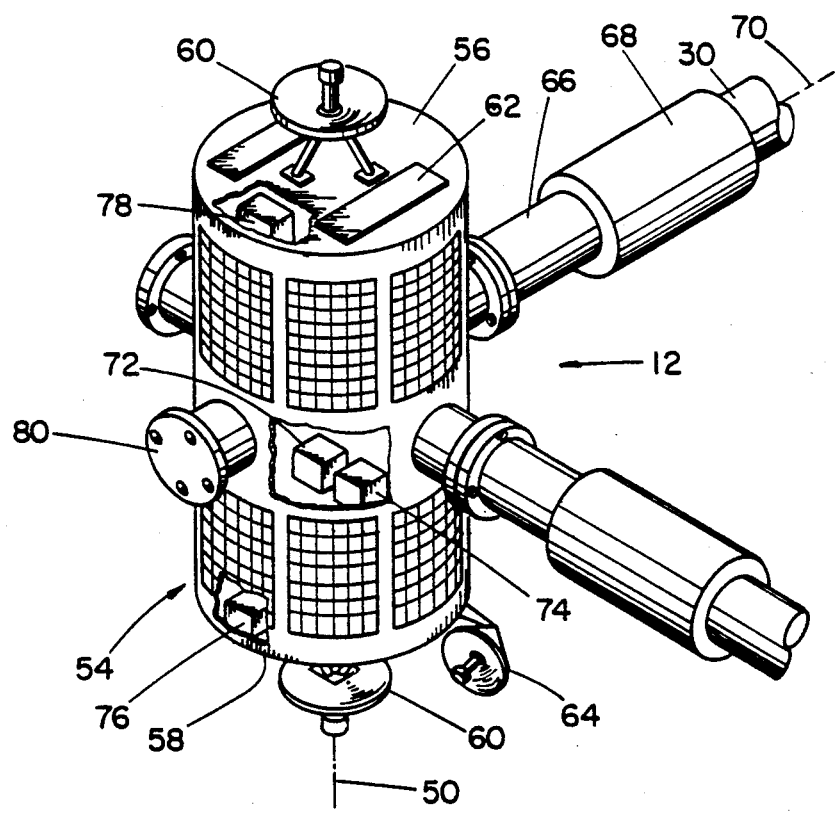
FIG. 2 is an enlarged pictorial view of the sweeper core generally shown in FIG. 1, illustrating two of the four booms attached to the sweeper core.

Referring to FIG. 2, the sweeper core 12 supports an upper tracking platform 56 and a similar lower platform 58. An active radar tracking antenna 60 is provided on each platform, along with one or more passive infrared detectors 62. Antennas 60 and detectors 62 monitor the course or path of particles of at least a selected size (typically greater than 1 centimeter in nominal diameter) in the vicinity of the sweeper 10, and input this tracking information for each particle in real time to a detector electronics package 58 housed within the core 12. Since the sweeper is monitoring the path of orbiting particles in its immediate vicinity, particles of much smaller size than those conventionally monitored by earth based systems may be reliably tracked. A communications antenna 64 mounted to the core 12 and associated electronics 76 housed within the core allow conventional two-way communication between the sweeper 10 and either earth-based or orbiting command stations. This communication system will allow another station to provide early and/or redundant detection of large particles, and will allow earth-based operations to monitor the activity of the sweeper and its efficiency in reducing debris population. An earth-based control station (not shown) may thus receive telemetered information from the sweeper and transmit control signals to the sweeper via the communications antenna 64 and the associated communications electronics package 76.

A plurality of photovoltaic arrays 54 are provided on the exterior surface of the core 12, and generate electrical power for all powered systems on the sweeper. A computer 72 receives signals from the detector electronics 78 and the communications electronics 76, and outputs control signals to a power control unit 74. Based on the size of monitored particles which have a path or trajectory which will pass through the area 34 swept by the sweeper, the computer 72 determines if individual particles preferably impact one of the panels 14 or pass between the trailing edge of one panel and the leading edge of a succeeding panel. The rotational velocity of the panels may then be slowed or increased by extending or retracting the panels to cause the desired impact with intermediate-sized particles, and to avoid impact with large particles. Small particles less than 1 centimeter in nominal diameter may or may not be monitored, and typically the rotational velocity of the panels would not be adjusted as a function of trajectory of those particles.

A separate drive unit 68 responsive to the control unit 78 may be provided for extending or retracting each boom 30 and thus the panel 14 associated with that boom. This design allows for simultaneous extension of the panels to effect a change in their rotational velocity without causing a change in the position of the sweeper core, but also allows asymmetrical extension or retraction of the panels to effect both a change in the rotational velocity of the panels and the position of the sweeper. If a large particle trajectory indicated possible impact with the sweeper core, the panels could be asymmetrically extended or retracted, which would then cause the core to effectively move to avoid the collision. This movement could be sufficient to move the sweeper such that the large particle passed outside the swept area 34. Alternatively, the change in sweeper position may be merely sufficient to ensure that the large particle does not impact the core 12, and the panels 14 then simultaneously extended or retracted (if necessary) to ensure that the large particle passed between the trailing edge of one panel and the leading edge of the succeeding panel. Utilizing more refined techniques, one could ensure that intermediate-sized particles impacted the fabric 24 but not the frame 16.

FIG. 2 depicts a mounting bracket 80 affixed to the core 12 for interconnection with a respective boom or arm 30. In one embodiment, each boom 30 has a fixed axial length, and panel extension or retraction is obtained by drive unit 68 causing an axial telescoping movement between boom 30 and a respective extension member 66 affixed to the mounting bracket 80. Various drive mechanisms may be utilized to achieve the desired panel extension or retraction, and preferred mechanism has high reliability and is both light-weight and compact in size.

The sweeper core may be deployed and the booms 30 and associated panels 14 subsequently affixed to a respective mounting bracket 80. If only two panels are utilized, the panels would be secured to radially opposing mounting brackets. Accordingly, it should be understood that two additional booms 30 and panels 14 will be secured to the sweeper core 12 shown in FIG. 2. Once activated, the panels continually rotate about the central axis 50 of the sweeper. The core 12 preferably rotates with the panels as shown in FIG. 1, although the panels could rotate about an otherwise stationary core.

The impact panels 14 need not be substantially rectangular in configuration, and could have a generally pie-shaped or an oval configuration. It is a feature of the invention, however, that the debris impact area of the plurality of panels is substantially less than the area swept by the rotating panels, and preferably less than about 20% of the area swept by the rotating panels. Sizable gaps are intentionally provided between rotating panels to enable large objects to avoid impact with the sweeper by allowing those particles to pass between the rotating panels. This feature of the invention may also be used in the design of large space structures other than sweepers, such as solar powered satellites, to avoid collision between the large space structure and orbiting particles which may impact and thereby damage the structure.

The foregoing disclosure and description of the invention are thus illustrative and explanatory thereof, and various changes and modifications in the details may be made without departing from the spirit of the invention, which is defined by the scope of the claims attached hereto.

What is claimed is:

1. An orbital debris sweeper for removing particles from orbit which otherwise may impact and damage an orbiting spacecraft, the orbital debris sweeper comprising:
   a sweeper core having a central sweeper axis;
   a debris monitoring unit carried by the sweeper core for monitoring the trajectory and size of individual orbiting particles in the vicinity of the debris sweeper;
   a plurality of impact panels rotatable about the central sweeper axis, each impact panel having a cantilevered end extending radially outward from the sweeper core, a leading edge circumferentially spaced from a rotationally preceding panel, and a trailing edge circumferentially spaced from the leading edge of a rotationally succeeding panel;
   a plurality of radially extendable and retractable booms each interconnecting the sweeper core and a corresponding impact panel;
   a computer responsive to the debris monitoring unit for determining whether, as a function of the monitored size of an individual particle, the individual particle preferably impacts one of the rotating impact panels or passes between the rotating impact panels; and a power control unit responsive to the computer for extending or retracting one or more of the booms to change the moment of inertia of the sweeper and thereby the rotational velocity of the plurality of rotating panels to increase panel impact frequency of particles which preferably impact one of the panels while reducing panel impact frequency of particles which preferably pass between the rotating panels.

2. An orbital debris sweeper as defined in claim 1, wherein the power control unit includes a plurality of drive motors for simultaneously extending or retracting each of the plurality of panels, such that the position of the sweeper core remains substantially constant while the rotational velocity of the impact panels is varied.

3. An orbital debris sweeper as defined in claim 1, wherein the debris monitoring unit includes a radar detection device for monitoring both the path and size of individual particles in the vicinity of the debris sweeper.

4. An orbital debris sweeper as defined in claim 1, wherein each of the impact panels comprises:
 a light-weight frame; and
 a sheet-like fabric material carried by the frame for decelerating particles which impact and pierce through the fabric material.

5. An orbital debris sweeper as defined in claim 4, wherein each of the impact panels lies substantially within a plane defined by the rotating impact panels.

6. An orbital debris sweeper as defined in claim 5, wherein each of the impact panels has a generally rectangular configuration within the plane defined by the rotating impact panels.

7. An orbital debris sweeper as defined in claim 1, further comprising:
 a sweeper propulsion device for altering the rotational velocity of the plurality of impact panels.

8. An orbital debris sweeper as defined in claim 1, wherein the power control unit asymmetrically extends or retracts the plurality of impact panels in response to the computer to alter the position of the sweeper core.

9. An orbital debris sweeper as defined in claim 1, further comprising:
 a plurality of photovoltaic arrays supported on the sweeper core for powering the power control unit.

10. An orbital debris sweeper as defined in claim 1, further comprising:
 interconnection means for normally interconnecting each of the booms with the sweeper core such that the impact panels are symmetrically positioned about the central sweeper axis.

11. An orbital debris sweeper for removing from orbit particles having a trajectory monitored by a debris monitoring unit, the orbital debris sweeper comprising:
 a sweeper core having a central sweeper axis:
 a plurality of impact panels continually rotatable about the central sweeper axis, each impact panel having a cantilevered end extending radially outward from the sweeper core, a leading edge circumferentially spaced from a rotationally preceding panel, and a trailing edge circumferentially spaced from the leading edge of a rotationally succeeding panel;
 a plurality of radially extendable and retractable booms each interconnecting the sweeper core and a corresponding impact panel;
 a power control unit responsive to the debris monitoring unit for extending or retracting one or more of the booms to change the moment of inertia of the sweeper and thereby the rotational velocity of the plurality of rotating panels to increase panel impact frequency of particles which impact one of the panels.

12. An orbital debris sweeper as defined in claim 11, wherein the debris monitoring unit includes a radar detection device carried by the sweeper core.

13. An orbital debris sweeper as defined in claim 11, wherein each of the impact panels comprises:
 forming each of the impact panels in a generally thin large impact area configuration; and
 positioning each of the impact panels such that its large impact area configuration lies within a plane defined by the rotating impact panels.

14. An orbital debris sweeper as defined in claim 13, wherein each of the impact panels lies substantially within a plane defined by the rotating impact panels.

15. A method of removing particles from orbit, the method comprising:
 orbiting a debris sweeper having a plurality of impact panels continually rotating about a central sweeper rotational axis, each impact panel having a leading edge circumferentially spaced from a rotationally preceding panel, and a trailing edge circumferentially spaced from the leading edge of a rotationally succeeding panel;
 monitoring the path and size of individual orbiting particles which pass in the vicinity of an area swept by the rotating panels;
 determining whether individual monitored particles preferably impact one of the rotating impact panels or pass between the rotating panels; and
 radially extending or retracting one or more of the impact panels with respect to the central sweeper rotational axis to change the moment of inertia of the rotating panels and thereby the rotational velocity of the rotating panels to increase panel impact frequency of particles which preferably impact one of the panels while reducing panel impact frequency of particles which perferably pass between the rotating panels.

16. A method as defined in claim 15, further comprising:
 simultaneously extending or retracting each of the plurality of panels with respect to the central sweeper rotational axis, such that the position of the sweeper rotational axis remains substantially unchanged during extension or retraction of the panels.

17. A method as defined in claim 15, further comprising:
 forming each of the impact panels from a light-weight frame and a sheet-like fabric material supported on the frame.

18. A method as defined in claim 17, further comprising:
 forming each of the impact panels in a generally thin large impact area configuration; and
 positioning each of the impact panels such that its large impact area configuration lies within a plane defined by the rotating impact panels.

19. A method as defined in claim 15, further comprising:
 asymmetrically extending or retracting the plurality of panels from the central sweeper rotational axis to alter the position of the central sweeper rotational axis.

20. A method as defined in claim 15, further comprising:
   positioning a propulsion device on one of the impact panels; and
   selectively activating the propulsion device to increase the rotational velocity of the rotating impact panels.

* * * * *